United States Patent
Lichter et al.

(10) Patent No.: US 9,728,977 B2
(45) Date of Patent: Aug. 8, 2017

(54) CONTROL OF POWER DISTRIBUTION SYSTEM

(71) Applicant: Electronic Theatre Controls, Inc., Middleton, WI (US)

(72) Inventors: Michael Lichter, Holzkirchen (DE); Tom Steer, Madison, WI (US); David North, Madison, WI (US); Jake Dunnum, Prairie Du Sac, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 359 days.

(21) Appl. No.: 14/271,614

(22) Filed: May 7, 2014

(65) Prior Publication Data

US 2015/0326020 A1 Nov. 12, 2015

(51) Int. Cl.
  *H02J 4/00* (2006.01)
  *H02J 3/14* (2006.01)
  *H02J 13/00* (2006.01)

(52) U.S. Cl.
  CPC ...... *H02J 4/00* (2013.01); *H02J 3/14* (2013.01); *H02J 13/0006* (2013.01);
  (Continued)

(58) Field of Classification Search
  CPC .............................. Y10T 307/469; H02J 4/00
  (Continued)

(56) References Cited

U.S. PATENT DOCUMENTS

| 7,657,763 | B2 | 2/2010 | Nelson et al. | |
| 8,471,415 | B1 * | 6/2013 | Heninwolf | H01R 13/6683 307/125 |

(Continued)

FOREIGN PATENT DOCUMENTS

| EP | 2618457 | 7/2013 |
| WO | 2009134222 A1 | 11/2009 |
| WO | 2011021973 A1 | 2/2011 |

OTHER PUBLICATIONS

International Search Report for Application No. PCT/US2015/017766 dated May 7, 2015 (4 pages).

(Continued)

*Primary Examiner* — Rexford Barnie
*Assistant Examiner* — Joseph Inge
(74) *Attorney, Agent, or Firm* — Michael Best & Friedrich LLP

(57) ABSTRACT

A method of controlling a plurality of outlets and a first and a second non-transitory medium for use in connection with in a power distribution. The power distribution system includes a handheld device, a power distribution device, and the plurality of outlets. The handheld device includes a first controller. The power distribution device includes a second controller and is coupled to the plurality of outlets to provide electrical power thereto. The power distribution device is physically separated from the plurality of outlets and is located not in close proximity to an outlet of the plurality of outlets. Each outlet of the plurality of outlets includes a socket and indicia located proximate to the socket. The first non-transitory medium includes instructions that when executed by the first controller cause the first controller to scan indicia of a first outlet and receive a set of input data. The first non-transitory medium also includes instructions that when executed by the first controller cause the first controller to determine and transmit a target setting of the first outlet based on the first set of input data and the scanned indicia. The second non-transitory medium includes instructions that when executed by the second controller cause the second controller to receive the target setting, and provide electrical power to the first outlet based on the target setting.

17 Claims, 10 Drawing Sheets

(52) U.S. Cl.
CPC ..... *H02J 2003/143* (2013.01); *Y02B 70/3225* (2013.01); *Y02B 70/3266* (2013.01); *Y04S 20/222* (2013.01); *Y04S 20/242* (2013.01); *Y10T 307/469* (2015.04)

(58) Field of Classification Search
USPC .......................................................... 307/39
See application file for complete search history.

(56) References Cited

U.S. PATENT DOCUMENTS

| | | | | |
|---|---|---|---|---|
| 2007/0155349 | A1* | 7/2007 | Nelson | H02J 13/0013 455/128 |
| 2010/0274725 | A1* | 10/2010 | Holbery | G06Q 20/102 705/63 |
| 2011/0291813 | A1* | 12/2011 | Jansma | G06F 1/266 340/10.5 |
| 2013/0253720 | A1* | 9/2013 | Luo | G06F 1/26 700/295 |
| 2013/0300545 | A1* | 11/2013 | Rao | G08C 17/02 340/12.5 |
| 2014/0032003 | A1* | 1/2014 | Chapel | G05B 15/02 700/295 |

OTHER PUBLICATIONS

International Written Opinion for Application No. PCT/US2015/017766 dated May 7, 2015 (6 pages).

International Preliminary Report on Patentability and Written Opinion dated Nov. 8, 2016 (8 pages).

\* cited by examiner

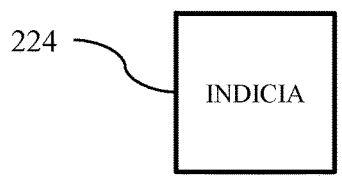
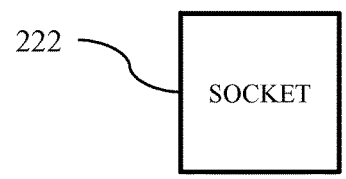
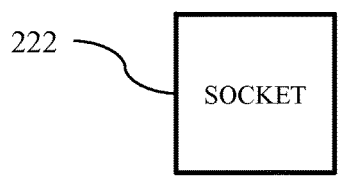
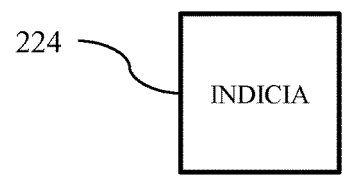
Fig. 8A
Fig. 8B
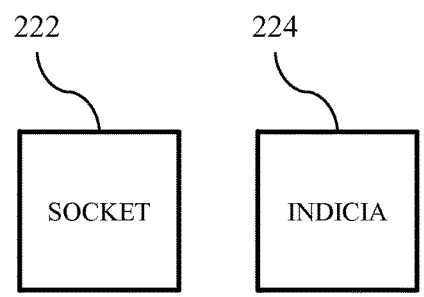
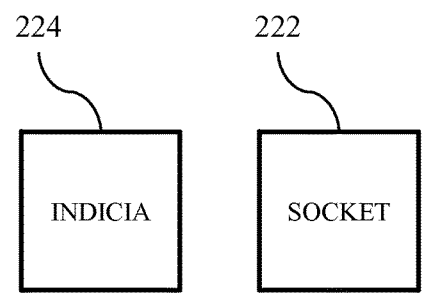
Fig. 8C
Fig. 8D

CONTROL OF POWER DISTRIBUTION SYSTEM

BACKGROUND

The invention relates to systems and methods of controlling and monitoring a plurality of outlets in a power distribution system using indicia to identify each outlet.

In a power distribution system including a plurality of outlets, conventionally, the power configuration of each outlet can only be set at a central power distribution device (e.g. a dimmer rack). In an entertainment venue (e.g., a theater, a hall, an auditorium, or the like), where the power configuration of the outlets has to change on a constant basis, only being able to set the power configuration of each outlet at the central power distribution device significantly impedes the process of preparing the venue.

SUMMARY

The invention provides a first and a second non-transitory medium for use in connection with a power distribution system. The power distribution system includes a handheld device, a power distribution device, and a plurality of outlets. The handheld device includes a first controller. The power distribution device includes a second controller and is coupled to the plurality of outlets to provide electrical power thereto. The power distribution device is physically separated from the plurality of outlets and is located not in close proximity to an outlet of the plurality of outlets. Each outlet of the plurality of outlets includes a socket and a unique identifier, such as indicia, located proximate to the socket. The first non-transitory medium includes instructions that when executed by the first controller cause the first controller to scan the unique identifier of a first outlet and receive a set of input data. The first non-transitory medium also includes instructions that when executed by the first controller cause the first controller to determine and transmit a target setting of the first outlet based on the first set of input data and the scanned unique identifier. The second non-transitory medium includes instructions that when executed by the second controller cause the second controller to receive the target setting, and provide electrical power to the first outlet based on the target setting.

The invention also provides a method of controlling a plurality of outlets in a power distribution system that includes a handheld device, a power distribution device, and the plurality of outlets. The handheld device includes a first controller and a first communication module that is coupled to the first controller. The power distribution device includes a second controller and a second communication module that is coupled to the second controller. The power distribution device is coupled to the plurality of outlets to provide electrical power thereto. The power distribution device is physically separated from the plurality of outlets and is located not in close proximity to an outlet of the plurality of outlets. Each outlet of the plurality of outlets includes a socket and indicia that is located proximate to the socket. The method includes scanning indicia of a first outlet with the handheld device and receiving a set of input data with the first controller. The method also includes determining, with the first controller, a target setting of the first outlet based on the set of input data and the scanned indicia. The method also includes transmitting the target setting with the first communication module. The method also includes receiving the target setting with the second communication module and providing electrical power to the first outlet based on the target setting with the second controller.

Other aspects of the invention will become apparent by consideration of the detailed description and accompanying drawings.

BRIEF DESCRIPTION OF THE DRAWINGS

FIGS. 8A-D are diagrams of outlets capable of being used in the power distribution system of FIG. 2.

DETAILED DESCRIPTION

Figure 1:
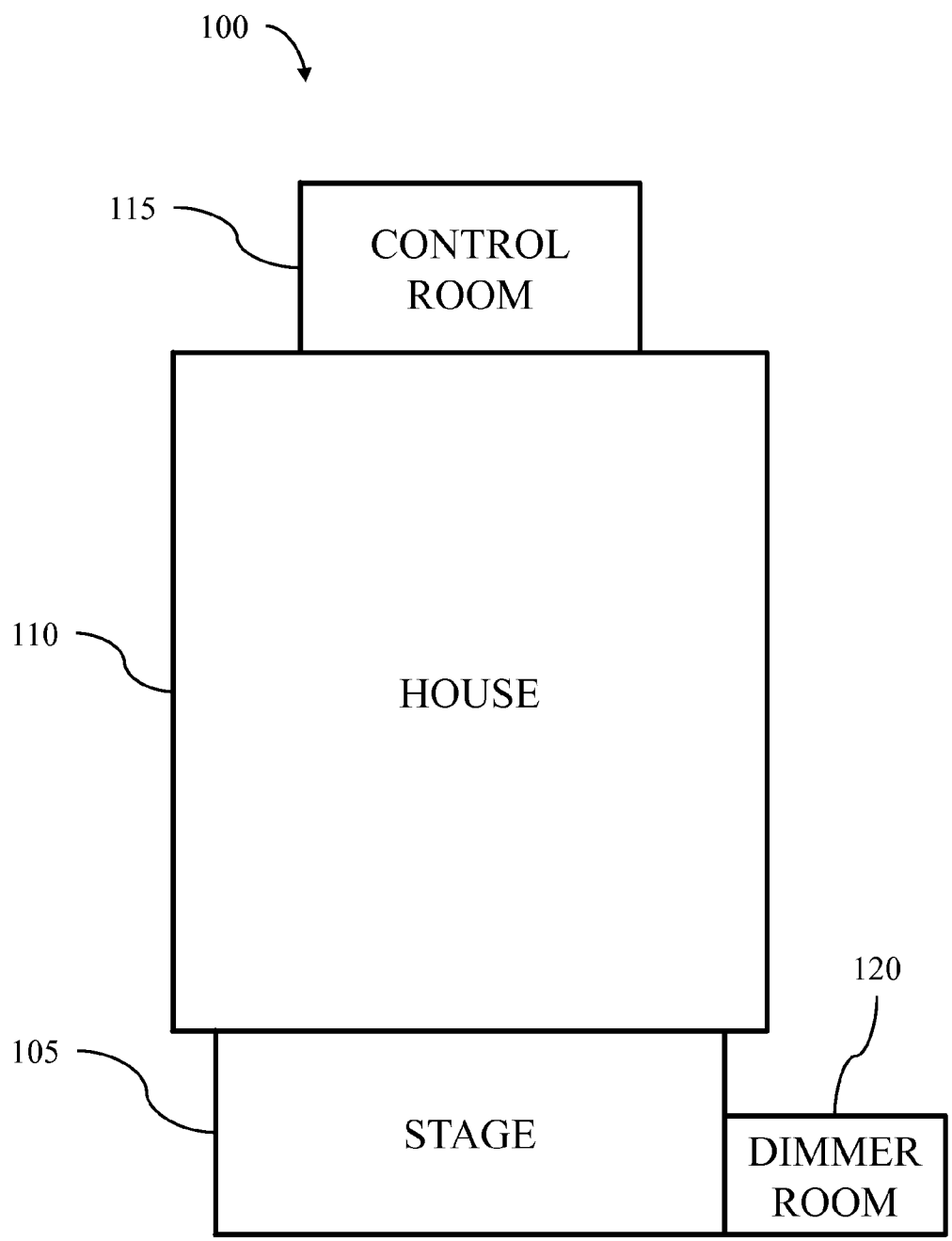
FIG. 1 is a diagram of a venue.

Before any implementations of the invention are explained in detail, it is to be understood that the invention is not limited in its application to the details of construction and the arrangement of components set forth in the following description or illustrated in the following drawings. The invention is capable of other implementations and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "set" is used broadly to refer to one or more. Also, electronic communications and notifications may be performed using other known means including direct connections, wireless connections, etc.

It should also be noted that a plurality of hardware and software based devices, as well as a plurality of different structural components may be utilized to implement the invention. Furthermore, and as described in subsequent paragraphs, the specific configurations illustrated in the drawings are intended to exemplify implementations of the invention. Alternative configurations are possible.

Conventionally, a power distribution system includes a plurality of outlets and a central power distribution device. The power distribution device supplies electrical power to the plurality of outlets. The power distribution device is configured to provide each outlet with one power configuration selected from a group of power configurations. The power distribution device is further configured to provide each outlet of the plurality of outlets with a power level (e.g., amount of electrical power) selected from a group of power levels.

Conventionally, the power configuration for each outlet is set directly at the power distribution device. However, it is common that all or at least some of the outlets are separate from and not in close proximity to the power distribution device. For example, an entertainment venue 100 includes, among other things, a stage 105, a house 110, a control room 115, and a dimmer room 120, as illustrated in FIG. 1. It is common for the power distribution device to be located within the dimmer room 120. It is also common that power distribution device provides electrical power to outlets that are located on the stage 105 and in the house 110.

The specific requirements for different uses of the venue typically require different electrical devices to be connected to different outlets. The electrical devices include variable-voltage devices (e.g., passive light fixtures that require dimmable power) and constant voltage devices (e.g., light fixtures with internal controls, smoke machines, lasers, etc.). In an exemplary situation, a person is replacing several fixed-voltage light fixtures with variable-voltage light fixtures for a plurality of outlets located on the stage 105. The person must walk between the stage 105 and the dimmer room 120 several times to change the power configuration of the outlets to the required configuration and to change the power level of each outlet to test the newly installed light fixtures. Alternatively, a second person, located at the dimmer room 120, can communicate with the person changing the light fixtures via a two-way radio.

The plurality of power configurations for the outlets include, for example, dimmer, relay, ON, and OFF. In the dimmer configuration, the power distribution device is configured to supply an outlet with a variable amount of electrical power on the continuum throughout the total range of electrical power that the power distribution device is capable of supplying. In the relay configuration, the power distribution device is configured to supply an outlet with one of two predetermined amounts of electrical power. In the ON configuration, the power distribution device is configured continuously supply an outlet with a first predetermined amount of electrical power. In certain implementation, the first predetermined amount of electrical power is the maximum amount of electrical power that the power distribution device is capable of supplying. In the OFF configuration, the power distribution device is configured to prohibit electrical power to an outlet.

The invention described herein relates to systems and methods for controlling a plurality of outlets in a power distribution system with a handheld device (e.g., phone, tablet, laptop, etc.). As such, the handheld device is configured to select an outlet of the plurality of outlets and to control the power configuration and power level of the selected outlet. The handheld device selects an outlet by scanning indicia located proximate to the outlet.

Figure 2:
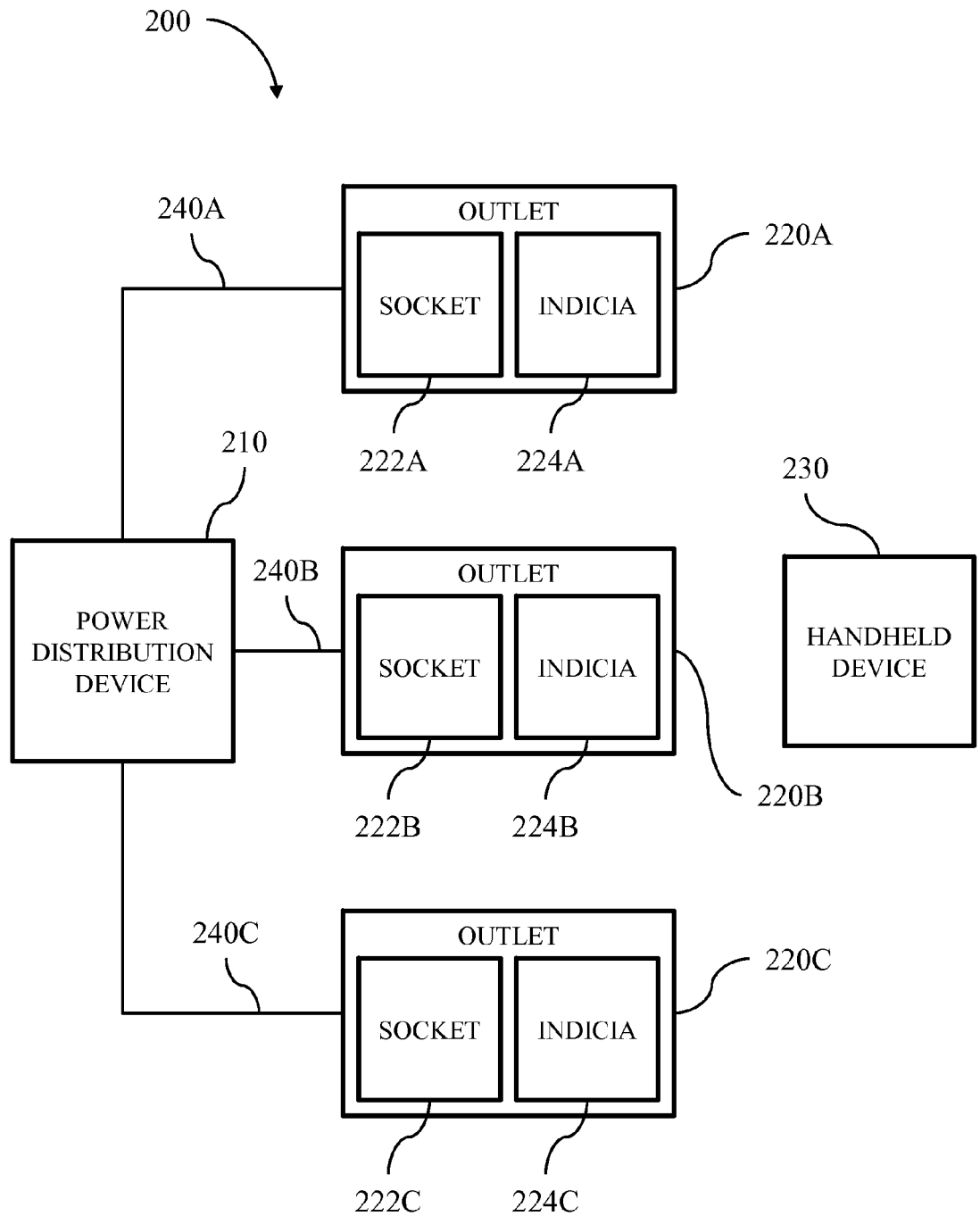
FIG. 2 is a block diagram of a power distribution system capable of being used in the venue of FIG. 1.

The power distribution system 200 includes, among other components, a power distribution device 210, a plurality of outlets 220A-220C, and a handheld device 230, as illustrated in FIG. 2. The power distribution device 210 is coupled, via power lines 240A-240C, to outlets 220A-220C to provide electrical power thereto. Each of the outlets 220A-220C include, among other components, a socket 222A-222C and indicia 224A-224C (e.g., barcode) associated with the socket. The sockets 222A-222C accept plugs from electrical devices (not shown) and provide electrical connections between the power distribution device 210 and the electrical devices. The indicia associated with an outlet is positioned proximate to the outlet. The handheld device 230 selects and identifies an outlet by scanning the indicia associated with the outlet. For example, the handheld device 230 identifies outlet 220B by scanning indicia 224B. The handheld device 230 communicates with the power distribution device 210 to monitor and control the present power configuration and power level of the selected outlet. In some implementations, as illustrated in FIG. 2, the power distribution system 200 includes three outlets 220A-220C. In other implementations, the power distribution system 200 includes more than or less than three outlets. In some implementations, the power distribution device 210 is additionally coupled to one or more outlets that are not included in the plurality of outlets. Each of these additional outlets, not included in the plurality of outlets, do not have indicia associate with each outlet.

Figure 3:
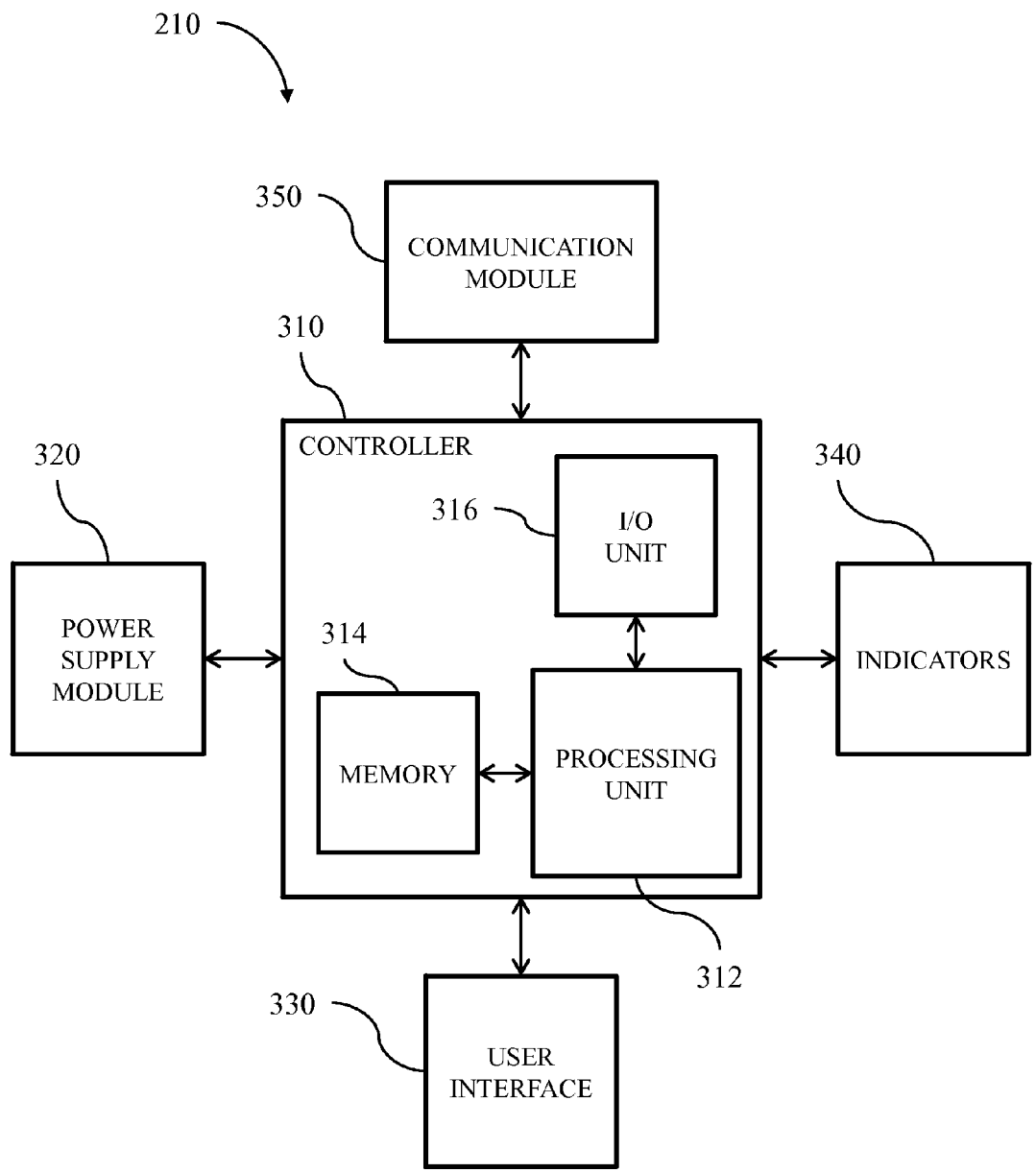
FIG. 3 is a block diagram of a power distribution device capable of being used in the power distribution system of FIG. 2.

FIG. 3 illustrates the power distribution device 210 of FIG. 2, including, among other components, a controller 310, a power supply module 320, a user interface 330, a set of indicators 340, and a communication module 350.

The controller 310 includes, or is connected to an external device (e.g., a computer), which includes combinations of software and hardware that are operable to, among other components, control the operation of one or more power distribution devices, control the instantaneous electrical power supplied to the outlets 220A-220C, and activate the one or more indicators 340 (e.g., light emitting diodes ("LEDs") or a liquid crystal display ("LCD")). In one implementation, the controller 310 or external device includes a printed circuit board ("PCB") that is populated with a plurality of electrical and electronic components that provide, power, operational control, and protection to the power distribution devices. In some implementations, the PCB includes, for example, a processing unit 312 (e.g., a microprocessor, a microcontroller, or another suitable programmable device), a memory 314, and a bus. The bus connects various components of the PCB including the memory 314 to the processing unit 312. The memory 312 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 312 is connected to the memory 314 and executes software that is capable of being stored in the RAM (e.g., during execution), the ROM (e.g., on a generally permanent basis), or another non-transitory computer readable medium such as another memory or a disc. Additionally or alternatively, the memory 314 is included in the processing unit 312. The controller 310 also includes an input/output ("I/O") unit 316 that includes routines for transferring information between components within the controller 310 and other components of the power distribution device 210 or the power distribution system 200. For example, the communication module 350 is configured to provide communication between the power distribution device 210 and one or more devices in the power distribution system 200.

Software included in some implementations of the power distribution device 210 is stored in the memory 314 of the controller 310. The software includes, for example, firmware, one or more applications, program data, one or more program modules, and other executable instructions. The controller 310 is configured to retrieve from memory 314 and execute, among other components, instructions related to the control processes and methods described below. For example, the controller 310 is configured to execute instructions retrieved from the memory 314 for performing a mathematical transformation of an input value to a control value that is required to provide a specific amount of electrical power to an outlet. In some implementations, the controller 310 or external device includes additional, fewer, or different components.

The PCB also includes, among other components, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 310.

The power supply module 320 supplies a nominal AC or DC voltage to the power distribution device 210. The power supply module 320 is powered by mains power having nominal line voltages between, for example, 100V and 240V AC and frequencies of approximately 50-60 Hz. The power supply module 320 is also configured to supply lower voltages to operate circuits and components within the power distribution device 210. In some implementations, the power supply module 320 includes, among other components, a plurality of dimmer modules (not shown) that supply variable electrical power to each outlet that the power distribution device 210 is coupled to. In some implementations, the power distribution device 210 is powered by one or more batteries or battery packs.

The user interface 330 is included to control the power distribution device 210 or the operation of the power distribution system 200 as a whole. The user interface 330 is operably coupled to the controller 310 to control, for example, the electrical power supplied to each of the outlets 220A-220C. The user interface 330 can include any combination of digital and analog input devices required to achieve a desired level of control for the system. For example, the user interface 330 can include a computer having a display and input devices, a touch-screen display, a plurality of knobs, dials, switches, buttons, faders, or the like. In some implementations, the user interface 330 is separated from the power distribution device 230.

The communication module 350 sends and/or receives signals to and/or from one or more separate communication modules. Signals include, among other components, information, data, serial data, and data packets. The communication module 350 can be coupled to one or more separate communication modules via wires, fiber, and/or a wirelessly. Communication via wires and/or fiber can be any appropriate network topology known to those skilled in the art, such as Ethernet. Wireless communication can be any appropriate wireless network topology known to those skilled in the art, such as Wi-Fi.

Figure 4:
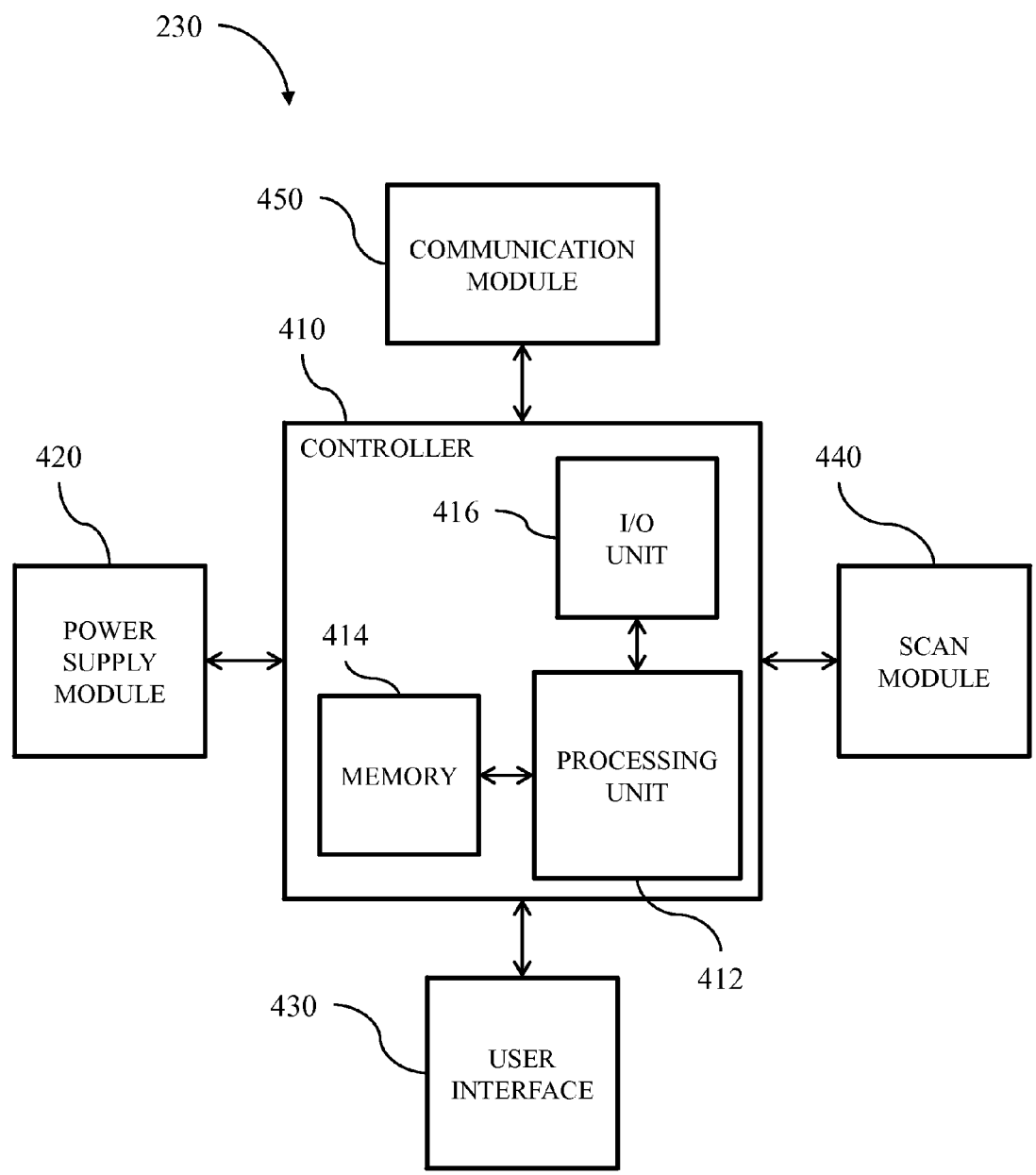
FIG. 4 is a block diagram of a handheld device capable of being used in the power distribution system of FIG. 2.

FIG. 4 illustrates the handheld device 230 of FIG. 2, including, among other components, a controller 410, a power supply module 420, a user interface 430, a scan module 440, and a communication module 450.

The controller 410 includes, or is connected to an external device (e.g., a computer), which includes combinations of software and hardware that are operable to, among other components, control the operation of one or more power distribution devices, control the instantaneous electrical power supplied to the outlets 220A-220C, and provide information related at least in part to one or more outlets or power distribution devices. In some implementations, the controller 410 or external device includes a printed circuit board ("PCB") that is populated with a plurality of electrical and electronic components that provide, power, operational control, and protection to the handheld device. In some implementations, the PCB includes, for example, a processing unit 412 (e.g., a microprocessor, a microcontroller, or another suitable programmable device), a memory 414, and a bus. The bus connects various components of the PCB including the memory 414 to the processing unit 412. The memory 414 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 412 is connected to the memory 414 and executes software that is capable of being stored in the RAM (e.g., during execution), the ROM (e.g., on a generally permanent basis), or another non-transitory computer readable medium such as another memory or a disc. Additionally or alternatively, the memory 414 is included in the processing unit 412. The controller 410 also includes an I/O unit 416 that includes routines for transferring information between components within the controller 410 and other components of the handheld device 230 or the power distribution system 200. For example, the communication module 450 is configured to provide communication between the handheld device 230 and one or more devices in the power distribution system 200.

Software included in some implementations of the handheld device 230 is stored in the memory 414 of the controller 410. The software includes, for example, firmware, one or more applications, program data, one or more program modules, and other executable instructions. The controller 410 is configured to retrieve from memory 414 and execute, among other things, instructions related to the control processes and methods described below. For example, the controller 410 is configured to execute instructions retrieved from the memory 414 for determining an outlet's identification number from an image taken by the scan module 440. In some implementations, the controller 410 or external device includes additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 410.

The power supply module 420 supplies a nominal AC or DC voltage to the handheld device 230. The power supply module 420 is also configured to supply lower voltages to operate circuits and components within the handheld device 230. In some implementations, the power supply module 420 is powered by one or more batteries or battery packs. In other implementations, the handheld device 420 is powered by mains power having nominal line voltages between, for example, 100V and 240V AC and frequencies of approximately 50-60 Hz. In other implementations, the handheld device 230 is powered by a combination of battery power and mains power.

The user interface 430 is included to control the handheld device 230 or the operation of the power distribution system 200 as a whole. The user interface 430 is operably coupled to the controller 410 to control, for example, the power configuration of each of the outlets 220A-220C. The user interface 430 can include any combination of digital and analog input devices required to achieve a desired level of control for the system. For example, the user interface 430 can include a computer having a display and input devices, a touch-screen display, a plurality of knobs, dials, switches, buttons, faders, or the like. In some implementations, the user interface 430 is separated from the handheld device 230.

For example, the user interface 430 is or includes a touch-screen display 500 that includes, among other components, a scan button 510, a dimmer button 520, a relay button 530, an ON button 540, an OFF button 550, a power level slider 560, and an information field 570. The controller 410 obtains an identifier of an outlet via the scan module 440 when the scan button 510 is selected. After obtaining an identity of the outlet from the identifier, one of the power configuration buttons 520, 530, 540, and 550 will perform a visual change (e.g., color change) to indicate the present power configuration of the outlet. For example, if the present power configuration of the outlet is relay, the relay button 530 will be highlighted. A user changes the present power configuration of the outlet by selecting one of the four power configuration buttons 520, 530, 540, and 550. Additionally, after obtaining the identity of the outlet, the slider 560 changes position along a vertical axis 565 to indicate the present power level of the outlet (i.e., the relative amount of electrical power that the power distribution device 210 is presently providing to the outlet).

If the present power configuration of an outlet is ON, the power level of the outlet is set to a maximum value (e.g., 100%) and the power distribution device 210 provides the outlet with a maximum amount of electrical power that the power distribution device 210 is capable of supplying. If the present power configuration of the outlet is OFF, the power level of the outlet is set to a minimum value (e.g., 0%) and the power distribution device 210 prohibits the outlet from receiving electrical power. In some implementations, if the present power configuration of the outlet is either ON or OFF, the user is prohibited from using the slider 560 to control the power level of the outlet. If the present power configuration of the outlet is relay or dimmer, the user changes the power level of the outlet by moving the slider 560 up or down the vertical axis 565. If the present power configuration of the outlet is dimmer, the power level of the outlet is set based on the exact or relative position of the slider 560 along the vertical axis 565. For example, if the slider 560 is positioned in the middle of the vertical axis 565, the power level of the outlet is set to 50% and the power distribution device 210 provides the outlet with 50% of the maximum amount of electrical power that the power distribution device 210 is capable of providing. If the present power configuration of the outlet is relay and the slider 560 is positioned at or above the middle of the vertical axis 565, the power level of the outlet is set to the maximum value and the power distribution device 210 provides the outlet with the maximum amount of electrical power that the power distribution device 210 is capable of providing. If the present power configuration of the outlet is relay and the slider 560 is positioned below the middle of the vertical axis 565, the power level of the outlet is set to the minimum value and the power distribution device 210 prohibits the outlet from receiving electrical power.

Figure 5:
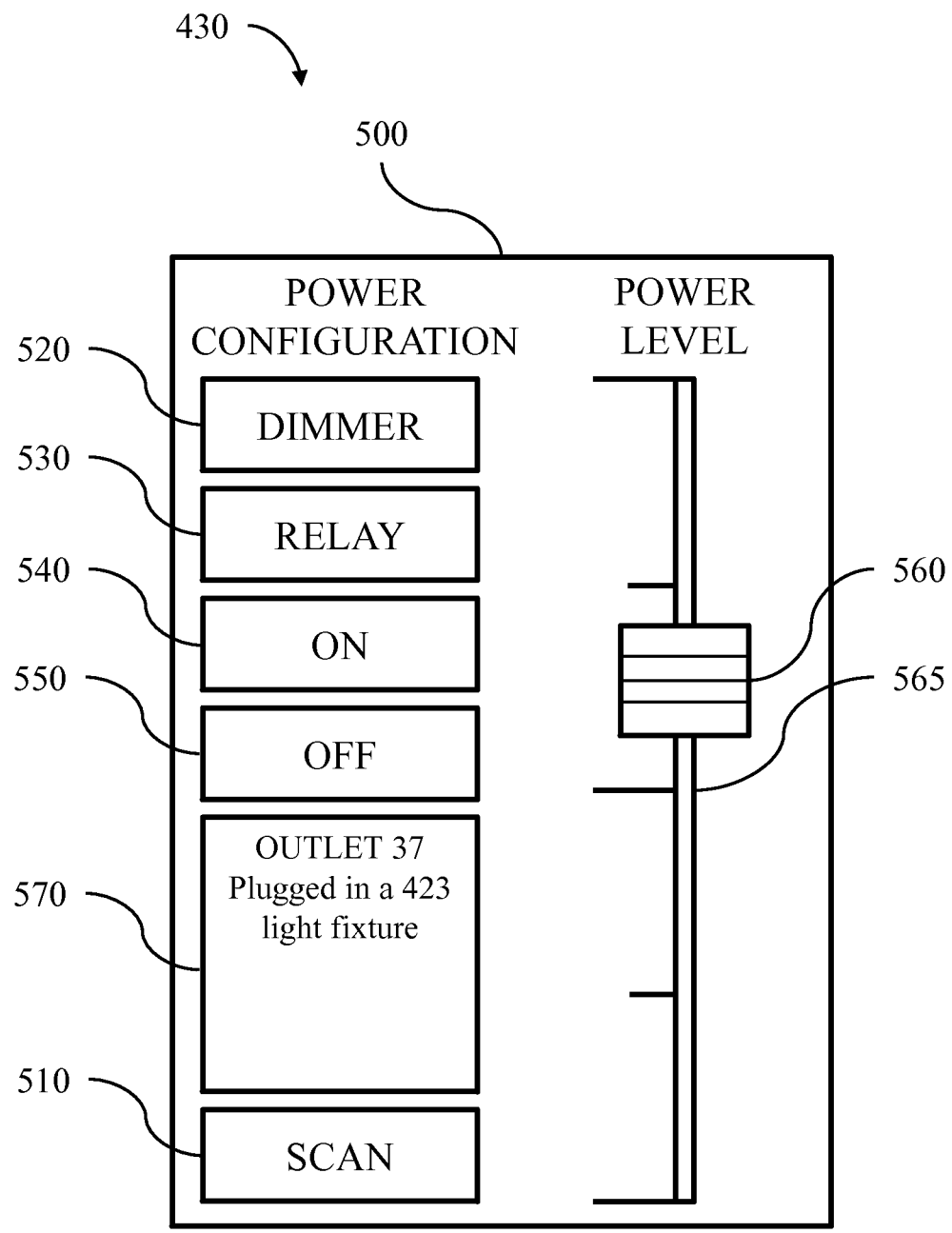
FIG. 5 is a diagram of a user interface capable of being used in the power distribution system of FIG. 2.

The information field 570 displays alpha-numeric characters to provide information about outlets, the handheld device 230, and/or the power distribution device 210. For example, the information field 570 can display the identity of an outlet (e.g., outlet number) after scanning the outlet's indicia. In some implementations, after scanning the outlet's indicia, the user can select the information field 570 and input a text message. The information field 570 can display the text message after every subsequent scan of the same indicia. For example, a user can input a text message indicating a type of light fixture that he or she has plugged into the socket of the outlet. In some implementations, if any components of the power distribution system 200 are not functioning properly, the information field 570 can display an error message indicating which components are malfunctioning and/or the cause of the malfunction. For example, the information field 570 can display a message indicating that a cooling fan in the power distribution device 210 is not functioning properly. FIG. 5 illustrates an exemplary display of information in the information field 570 after scanning an outlet's indicia including the number of the outlet and a text message indicating that the previous user plugged in a 423 light fixture into the socket of the outlet.

The scan module 440 is included to identify outlets via their indicia. The indicia can be an optical machine-readable representation of data, for example, a linear (i.e., one-dimensional) barcode, a matrix (i.e., two-dimensional) barcode, a human readable number number, etc. In some implementations, the scan module 440 is a camera. In other implementations, the scan module 440 is a barcode scanner/reader (e.g., pen-type, laser, charge-coupled device "CCD", camera-based, omni-directional, etc.) or other appropriate means to scan indicia, known to those skilled in the art.

In some implementations, the scan module 440 identifies outlets via electronic identification tag, for example, a radio frequency identification ("RFID") tag, a near field communication ("NFC") tag, etc. Each outlet includes an electronic identification tag that is located proximate to the outlet, comparable to implementations with indicia. In some implementations, the scan module 440 is electronic identification tag reader, for example, a radio frequency receiver or transceiver.

The communication module 450 sends and/or receives signals to and/or from one or more separate communication modules. Signals include, among other components, information, data, serial data, and data packets. The communication module 450 can be coupled to one or more separate communication modules via wires, fiber, and/or wirelessly. Communication via wires and/or fiber can be any appropriate network topology known to those skilled in the art, such as Ethernet. Wireless communication can be any appropriate wireless network topology known to those skilled in the art, such as Wi-Fi.

Figure 6:
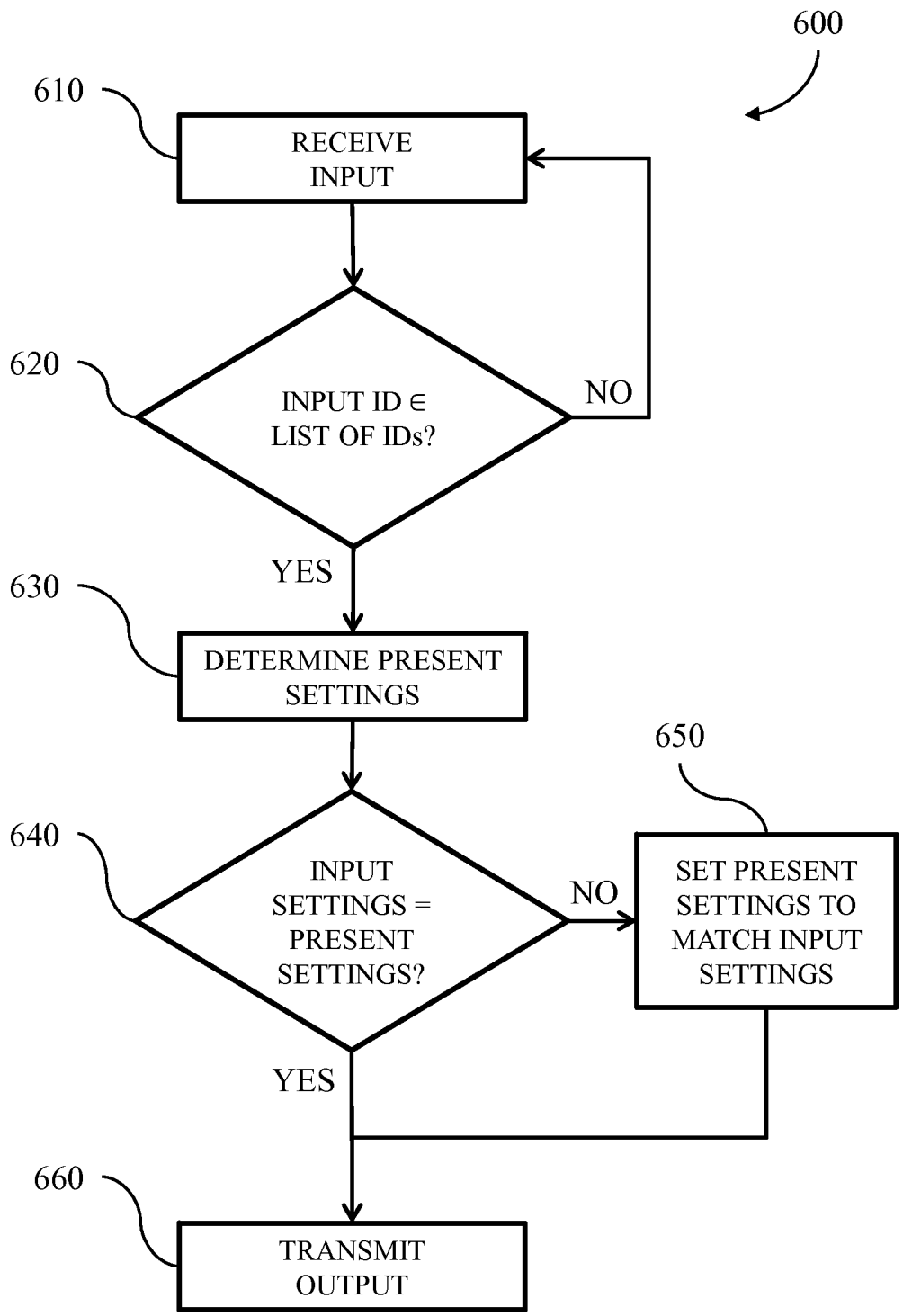
FIG. 6 represents a process for controlling a plurality of outlets with a handheld device.

FIG. 6 illustrates a process 600 for operating the power distribution device 210 to control the electrical power supplied to a selected outlet by the power distribution device 210. The steps of the process 600 are described in an iterative manner for descriptive purposes. Various steps described herein with respect to the process 600 are capable of being executed simultaneously, in parallel, or in an order that differs from the illustrated serial and iterative manner of execution. At step 610, the communication module 350 receives an input. The input is, for example, a streaming input of data values, a data packet, a set of data, etc. The input includes, among other components, an input identifier (e.g., identification ("ID") number) of the selected outlet, one or more input settings (e.g., target power configuration, target power level, etc.) for the selected outlet, and/or a text message related at least in part to the selected outlet. After the input has been received, the input is transmitted or transferred to the controller 310.

At step 620, the controller 310 compares the input identifier with a list of identifiers. The list of identifiers includes an identifier for each outlet that the power distribution device 210 is coupled to. The list of identifiers may be stored in the memory 314 of the controller 310. If the input identifier does not match with one of the identifiers in the list of identifiers, the controller 310 determines that the one or more input settings are not meant for an outlet which the controller 310 is coupled to and the process 600 returns to step 610 to receive a new input. On the other hand, if the input identifier matches with one of the identifiers in the list of the identifiers, the controller 310 determines that the one or more input settings are meant for the outlet with the matching identifier (i.e., the selected outlet) and the process 600 proceeds to step 630.

At step 630, the controller 310 determines the present settings of the selected outlet. The present settings include, for example, the present power configuration and the present power level of the selected outlet. The present power level corresponds to the amount of electrical power which the power distribution device 210 is presently supplying to or prohibiting power from the selected outlet. The controller 310 then compares the present settings with the input settings for the selected outlet (step 640). If one or more of the present settings is different from the input settings for the selected outlet, the process 600 proceeds to step 650 and the controller 310 sets the present settings to match the input settings for the selected outlet. For example, if the present power configuration and the input power configuration for the selected outlet is dimmer and relay, respectively, the controller 310 sets the present power configuration to relay. On the other hand, the controller 310 does not alter the present settings for the selecting outlet and the process 600 proceeds to step 660, if all or a portion of the present settings match the input settings.

At step 660, the communication module 350 transmits an output. The output is, for example, a streaming output of data values, a data packet, a set of data, etc. The output includes, among other components, the input identifier of the selected outlet, one or more present settings of the selected outlet, and one or more text messages related at least in part to the selected outlet or the power distribution system 200. In some implementations, the process 600 terminates after step 660 is complete. In other implementations, the process 600 proceeds to step 610 to receive a new input.

Figure 7:
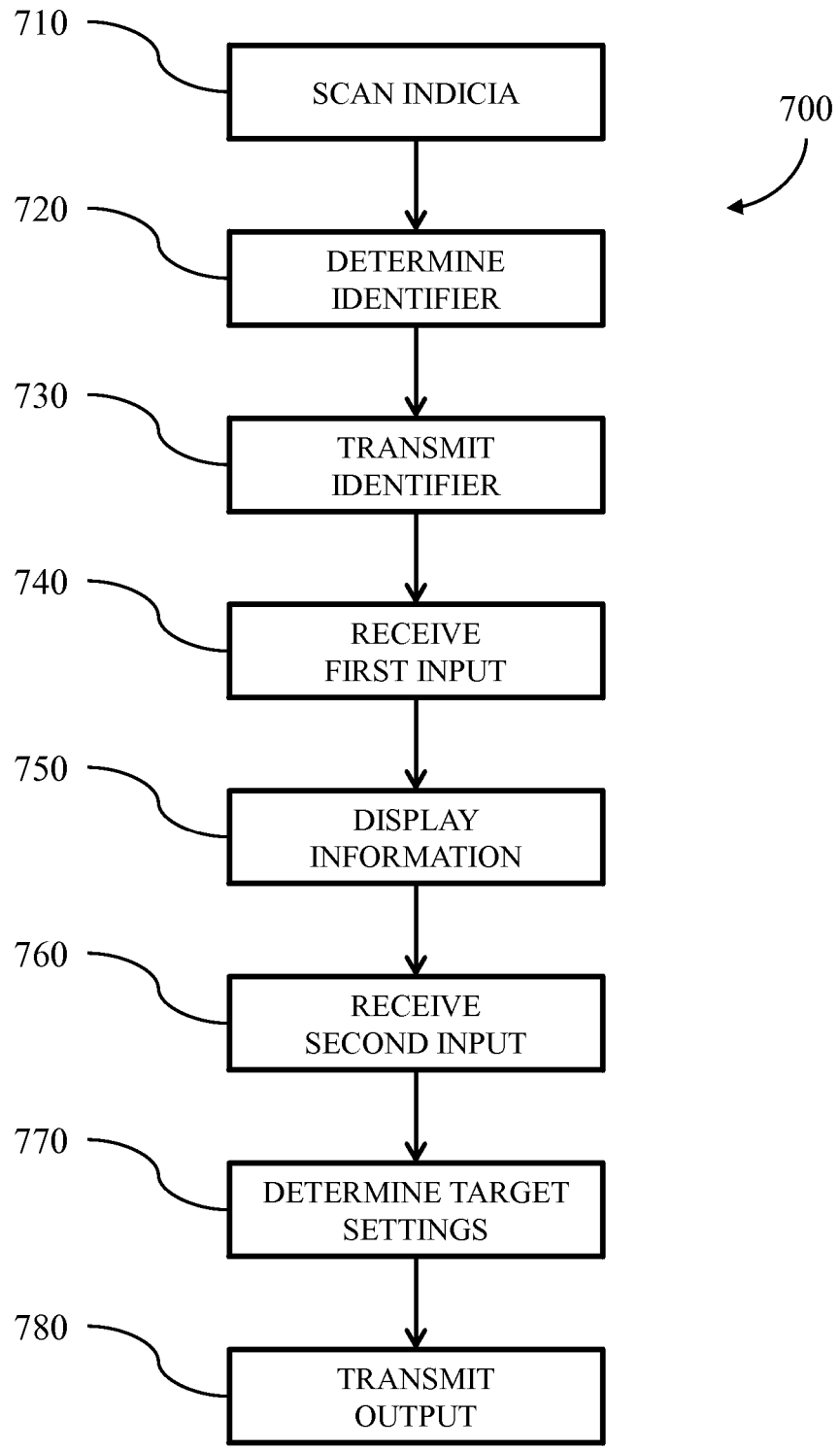
FIG. 7 represents a process for controlling a plurality of outlets with a power distribution device.

FIG. 7 shows a process 700 for operating the handheld device 230 to control electrical power supplied to a selected outlet by the power distribution device 210. The steps of the process 700 are described in an iterative manner for descriptive purposes. Various steps described herein with respect to the process 700 are capable of being executed simultaneously, in parallel, or in an order that differs from the illustrated serial and iterative manner of execution. At step 710, the scan module 440 scans indicia of the outlet. The indicia may be an optical machine-readable representation of data, for example, a linear (i.e., one-dimensional) barcode, a matrix (i.e., two-dimensional) barcode, a human readable number, etc. In some implementations, the scan module 440 is camera. In such implementations, scanning the indicia includes, generating one or more images of the indicia with the camera and transmitting or transferring the one or more images to the controller 410. In some implementations, the scan module 440 is a barcode reader or scanner. In such implementations, scanning the indicia includes projecting light toward the indicia and using a photodiode to measure the intensity of light that is reflected back from the indicia. The barcode scanner or reader transmits or transfers the measurements to the controller 410.

Next, at step 720, the controller 410 determines an identifier (e.g., word, number, letter, symbol, etc.) of the selected outlet based on the scanned indicia. Each outlet has a unique identifier that distinguishes it from every other outlet of the plurality of outlets. In some implementations, a first portion of the identifier is unique to each outlet and a second portion of the identifier represents characteristics of each outlet. For example, portions of the identifier can represent a type of outlet (e.g., maximum voltage rating), a general or specific location of the outlet (e.g., room number, wall number), and a unique identifier for the specific power distribution device that is coupled to the outlet.

After the identifier of the selected outlet is determined, the communication module 450 transmits the identifier of the selected outlet (step 730). The identifier is transmitted as, for example, a streaming output of data values, a data packet, a set of data, etc. Next, at step 740, the communication module 450 receives a first input. The first input is, for example, a streaming input of data values, a data packet, a set of data, etc. The first input includes, among other components, the identifier of the selected outlet, one or more input settings (e.g., present power configuration, present power level, etc.) of the selected outlet, and/or a text message related at least in part to the selected outlet. After the first input has been received, the first input is transmitted or transferred to the controller 410.

At step 750, the controller 410 displays information related at least in part to the selected outlet. This information can be displayed by the user interface 430. For example, the information is displayed visually on a touch-screen display of the user interface 430. The information displayed includes, among other things, the identifier of the selected outlet, one or more present settings of the selected outlet, and/or a text message related at least in part to the selected outlet.

In some implementations, step 730 and/or step 740 is omitted from process 700. In such implementations, the information displayed at step 750 includes, among other components, the identifier of the selected outlet and/or information related at least in part to the selected outlet stored in the memory 414.

At step 760, the controller 410 receives a second input. The second input is, for example, a steaming input of data values, a data packet, a set of data, etc. that correspond to one or more target settings (e.g., power configuration, power level, etc.) of the selected outlet. In some implementations, a user supplies the second input via the user interface 430. The user interface 430 includes a combination of digital and analog input devices that the user manipulates to select one or more target settings of the selected outlet. The user interface 430 can include a computer having a display and input devices, a touch screen display, a plurality of know, a plurality of dial, a plurality of switches, a plurality if buttons, or the like, as described above. For example, in accordance with the touch-screen display 500 illustrated in FIG. 5, the second input includes, among other components, the most recent power configuration button selected by the user and/or the present position of the slider 560 on the vertical axis 565. In some implementations, the controller 410 receives the second input from a computer or controller that is external to the handheld device 230. In some implementations, the controller 410 receives the second input via the communication module 450.

After the second input is received, the controller 410 determines one or more target settings for the outlet (step 770). In some implementations, the one or more target settings include a target power configuration and target power level of the selected outlet. For example, in accordance with the touch-screen display 500 illustrated in FIG. 5, if the second input indicates that the relay button 530 has been selected and the slider 560 is positioned between the 50% and the 75% portion of the vertical axis 565, the controller 410 determines that the target power configuration of the selected outlet is relay and the target power level of the selected relay is 100%.

At step 780, the communication module 450 transmits an output. The output is, for example, a streaming output of data values, a data packet, a set of data, etc. The output includes, among other components, the identifier of the selected outlet, one or more target settings of the selected outlet, and one or more text messages related at least in part to the selected outlet or the power distribution system 200. In some implementations, the process 700 terminates after step 780 is complete. In other implementations, the process 700 proceeds to step 710 to scan a new indicia. In other implementations, the process 700 proceeds to either step 740 or step 760 to receive a new first input or a new second input.

Figure 9:
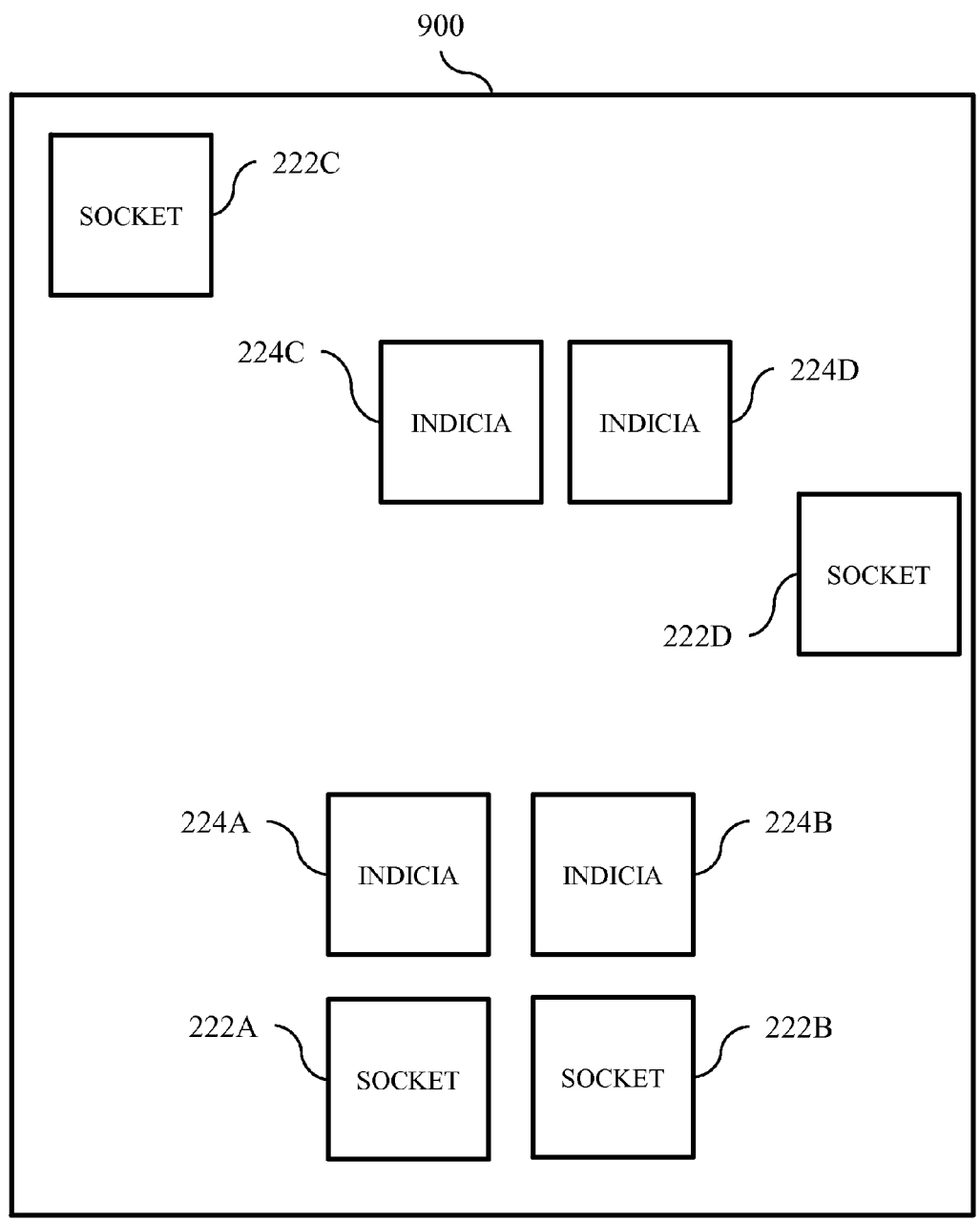
FIG. 9 is a diagram of outlets capable of being used in the power distribution system of FIG. 2.

As described above, the indicia associated with a socket, for each outlet, is positioned proximate to the socket. In other words, the indicia of an outlet is positioned close to the socket of the outlet in a manner that shows a very close and direct relationship between the indicia and the socket. In some implementations, the indicia is located directly adjacent to its associated socket. For example, if the socket 222 is located on a wall of a room, the indicia 224 can also be located on the wall and positioned directly above, below, to the right, or to the left of the socket 222, as illustrated in FIGS. 8A-8D respectively. In other implementations, the indicia is located near (e.g., a short distance away from) its associated socket. For example, the indicia can be located approximately 1 foot away from its associated socket. In some implementations, the position of the indicia relative to the socket for all or a portion of the plurality of outlets can be different. FIG. 9 illustrates an exemplary arrangement of fours sockets 222A-222D and four indicia 2224A-222D on a wall 900. Indicia 224A and 224B, associated with sockets 222A and 222B respectively, are positioned directly above sockets 222A and 222B. Indicia 224C, associated with socket 222C, is positioned a short distance away from socket 222C. Indicia 224D, associated with socket 222D, is positioned near socket 222D.

Figure 10:
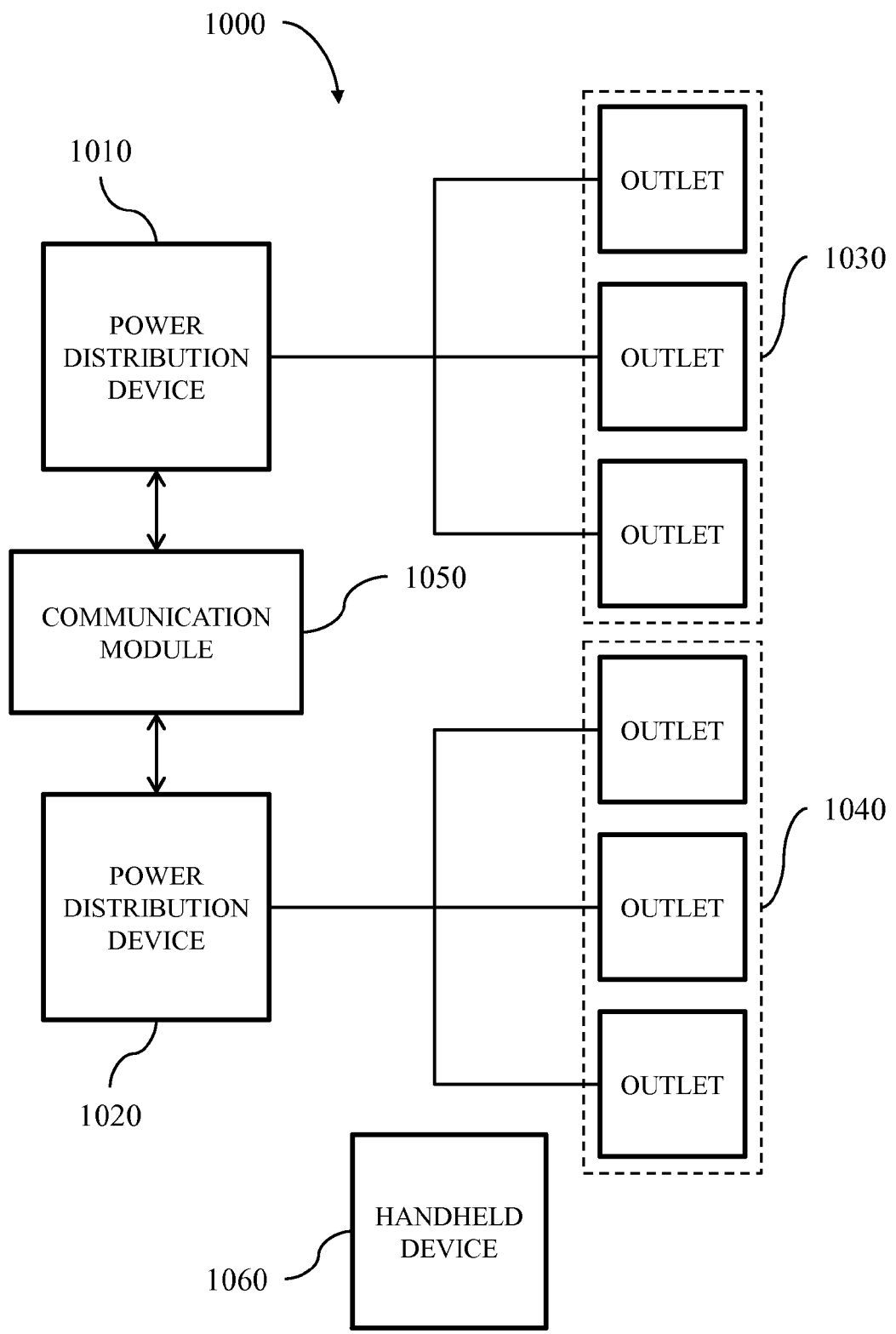
FIG. 10 is a block diagram of a second power distribution system capable of being used in the venue of FIG. 1.

In some implementations, the power distribution system includes more than one power distribution device. Each power distribution device is coupled to provide electrical power to a specific set of outlets of the plurality of outlets. FIG. 10 illustrates a power distribution system 1000 including, among other components, a first power distribution device 1010, a second power distribution device 1020, a first set of outlets 1030 coupled to the first power distribution device 1010, a second set of outlets 1040 coupled to the second power distribution device 1020, a communication module 1050, and a handheld device 1060. The first power distribution device 1010 and the second power distribution device 1020 are coupled to the communication module 1050. In some implementations, the handheld device 1060 communicates wirelessly, with the communication module 1050, for example, using Wi-Fi. The communication module 1050 communicates via wires or fiber with the first power distribution device 1010 and the second power distribution device 1020, for example using Ethernet. For example, the handheld device 1060 transmits information to the communication module 1050, related to a selected outlet. In some implementations, the communication module 1050 re-transmits all or a portion of the information to either the first power distribution device 1010 or the second power distribution device 1020, at least in part on whether the selected outlet coupled to the first power distribution device 1010 or the second power distribution device 1020. In other implementations, the communication module 1050 re-transmits all or a portion of the information to the first power distribution device 1010 and the second power distribution device 1020. Each power distribution device can use an outlet identifier included in the information to determine if the information is relevant to that power distribution device.

Thus, the invention provides, among other things, a system and method for controlling the configuration of and the electrical power supplied to a plurality of outlets in a power distribution system. Various features and advantages of the invention are set forth in the following claims.

What is claimed is:

1. A first and a second non-transitory medium for use in connection with a power distribution system comprising a handheld device, a power distribution device, and a plurality of outlets, the handheld device including a first controller, the power distribution device including a second controller, the power distribution device is located in a first room and is physically separated from the plurality of outlets, a first outlet of the plurality of outlets is located in a second room, each outlet of the plurality of outlets including a socket and indicia located proximate to the socket, the first non-transitory medium comprising instructions that when executed by the first controller cause the first controller to:

scan indicia of the first outlet, determine an identifier of the first outlet based on the scanned indicia, receive a set of input data via a user interface, determine a target setting of the first outlet based on the set of input data and the scanned indicia, and transmit the target setting, the second non-transitory medium comprising instructions that when executed by the second controller cause the second controller to:

receive the target setting, and provide electrical power to the first outlet based on the target setting.

2. The first and the second non-transitory medium of claim 1, wherein the handheld device further includes at least one selected from a group consisting of a camera, a barcode scanner, and a barcode reader.

3. The first and the second non-transitory medium of claim 1, wherein the indicia includes at least one selected from a group consisting of a linear barcode and a matrix barcode.

4. The first and the second non-transitory medium of claim 1, wherein the first non-transitory medium further includes instructions that when executed by the first controller cause the first controller to display information of the first outlet with the user interface.

5. The first and the second non-transitory medium of claim 4, wherein the information includes at least one selected from a group consisting of the identifier, a power configuration, a power level, and a text message.

6. The first and the second non-transitory medium of claim 1, wherein the target setting includes at least one selected from a group consisting of a power configuration and a power level.

7. The first and the second non-transitory medium of claim 1, wherein the target setting includes a power configuration, the power configuration having one selected from a group consisting of dimmer, relay, on, and off.

8. The first and the second non-transitory medium of claim 1, wherein the second non-transitory medium further includes instructions that when executed by the second controller cause the second controller to prohibit the first outlet from receiving electrical power based on the target setting.

9. A method of controlling a plurality of outlets in a power distribution system comprising a handheld device, a power distribution device, and the plurality of outlets, the handheld device including a first controller and a first communication module coupled to the first controller, the power distribution device including a second controller and a second communication module coupled to the second controller, the power distribution device being coupled to the plurality of outlets to provide electrical power thereto, the power distribution device being physically separated from the plurality of outlets, each outlet of the plurality of outlets including a socket and indicia located proximate to the socket, the method comprising:
  scanning, with the handheld device, indicia of a first outlet;
  receiving, with the first controller, a set of input data via a user interface;
  determining, with the first controller, a target setting of the first outlet based on the set of input data and the scanned indicia;
  determining, with the first controller, an identifier of the first outlet based on the scanned indicia;
  transmitting, with the first communication module, the target setting;
  receiving, with the second communication module, the target setting; and
  providing, with the second controller, electrical power to the first outlet based on the target setting,
  wherein the power distribution device is located in a first room and the first outlet is located in a second room.

10. The method of claim 9, further comprising
  determining, with the second controller, a present setting of the first outlet;
  transmitting, with the second communication module, the present setting;
  receiving, with the first communication module, the present setting; and
  displaying, with a user interface coupled to the first controller, the present setting.

11. The method of claim 10, wherein the present setting is different from the target setting.

12. The method of claim 9, further comprising transmitting, with the first communication module, the identifier; and receiving, with the second communication module, the identifier.

13. The method of claim 12, further comprising determining, with the second controller, a present setting of the first outlet based on the identifier.

14. The method of claim 9, wherein the target setting includes at least one selected from a group consisting of a power configuration and a power level.

15. The method of claim 9, wherein the target setting includes a power configuration, the power configuration having one selected from a group consisting of dimmer, relay, on, and off.

16. The method of claim 9, wherein the indicia includes at least one selected from a group consisting of a linear barcode, a matrix barcode, a human readable number.

17. The method of claim 9, further comprising prohibiting, with the second controller, the first outlet from receiving electrical power based on the target setting.

* * * * *